Aug. 14, 1934.  A. M. ROSSMAN  1,970,251
MECHANICAL MOVEMENT
Filed Feb. 4, 1932    12 Sheets-Sheet 8
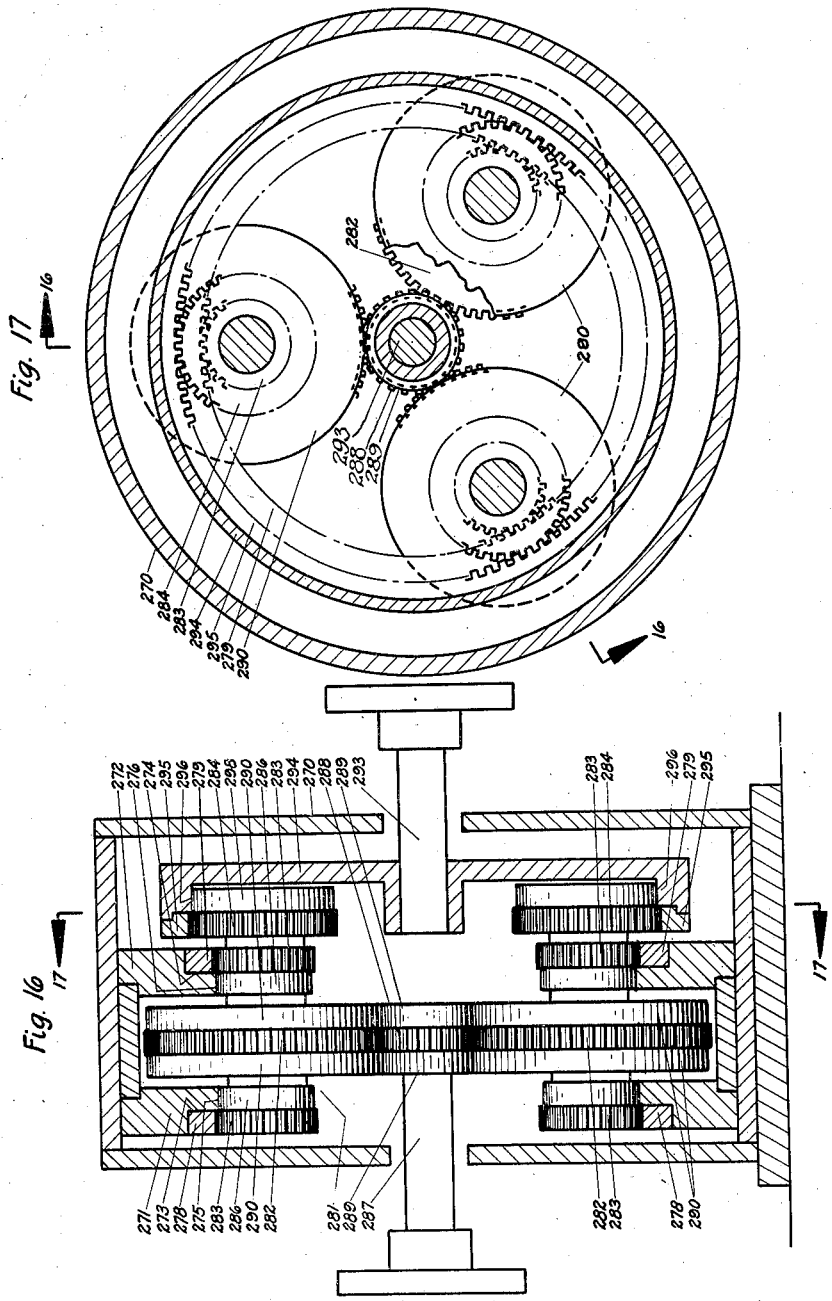
INVENTOR
ALLEN M. ROSSMAN
PER
Brown Jackson Boettcher & Dieuner
ATTORNEYS Aug. 14, 1934.  A. M. ROSSMAN  1,970,251
MECHANICAL MOVEMENT
Filed Feb. 4, 1932   12 Sheets-Sheet 9
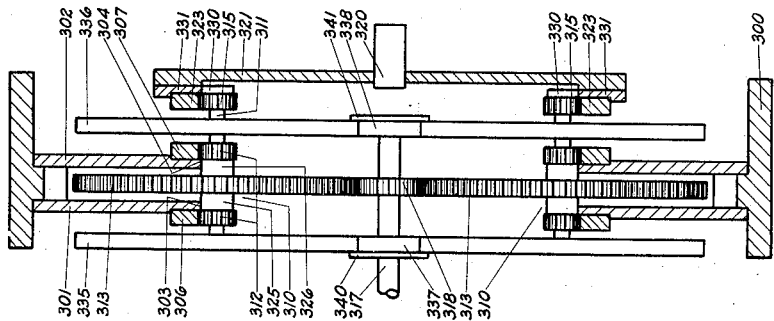
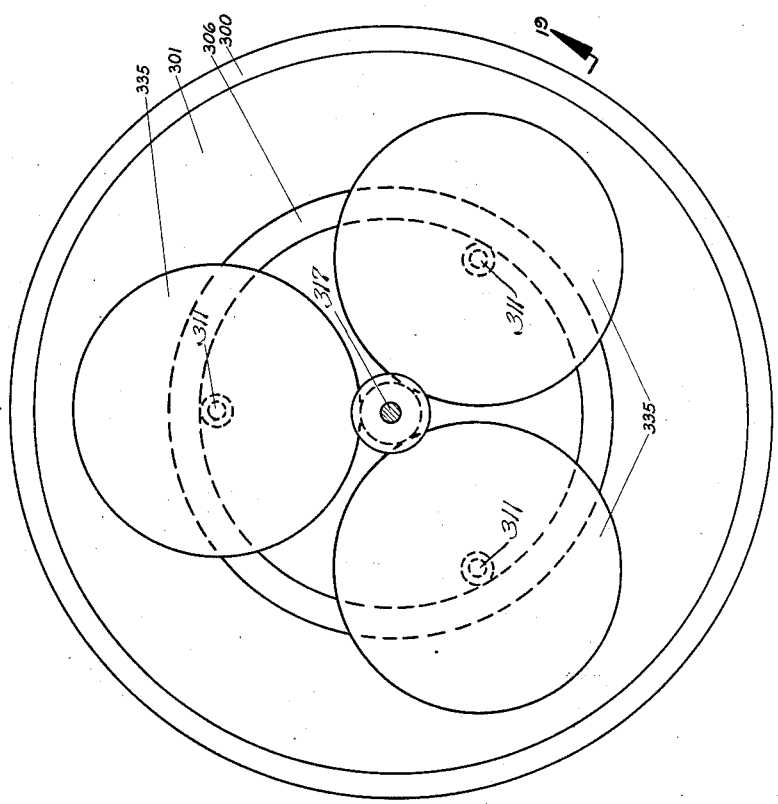
INVENTOR
ALLEN M. ROSSMAN
PER
ATTORNEYS Aug. 14, 1934.　　　　A. M. ROSSMAN　　　　1,970,251
MECHANICAL MOVEMENT
Filed Feb. 4, 1932　　　12 Sheets-Sheet 10
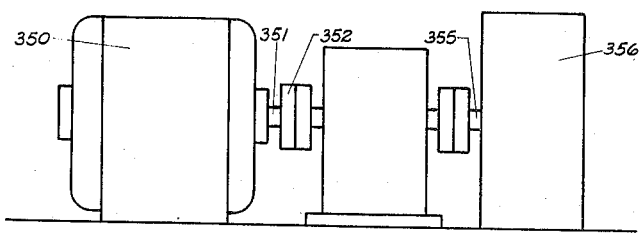
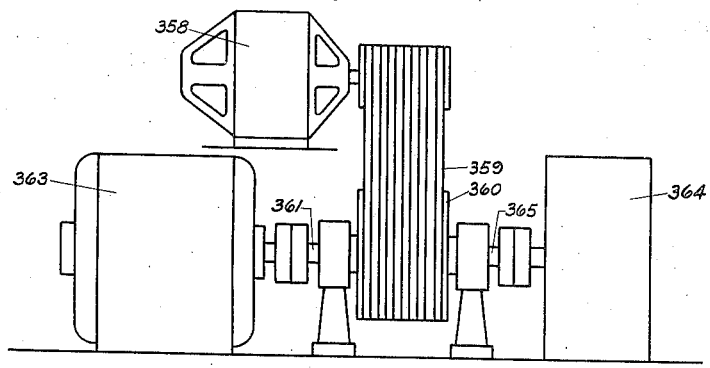
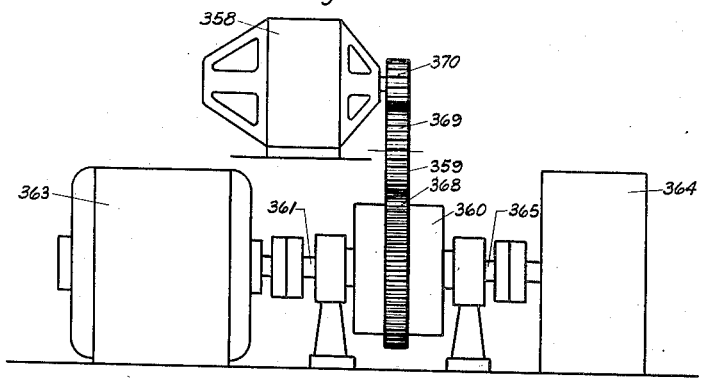
INVENTOR
ALLEN M. ROSSMAN
PER
ATTORNEYS Aug. 14, 1934.  A. M. ROSSMAN  1,970,251
MECHANICAL MOVEMENT
Filed Feb. 4, 1932  12 Sheets-Sheet 11

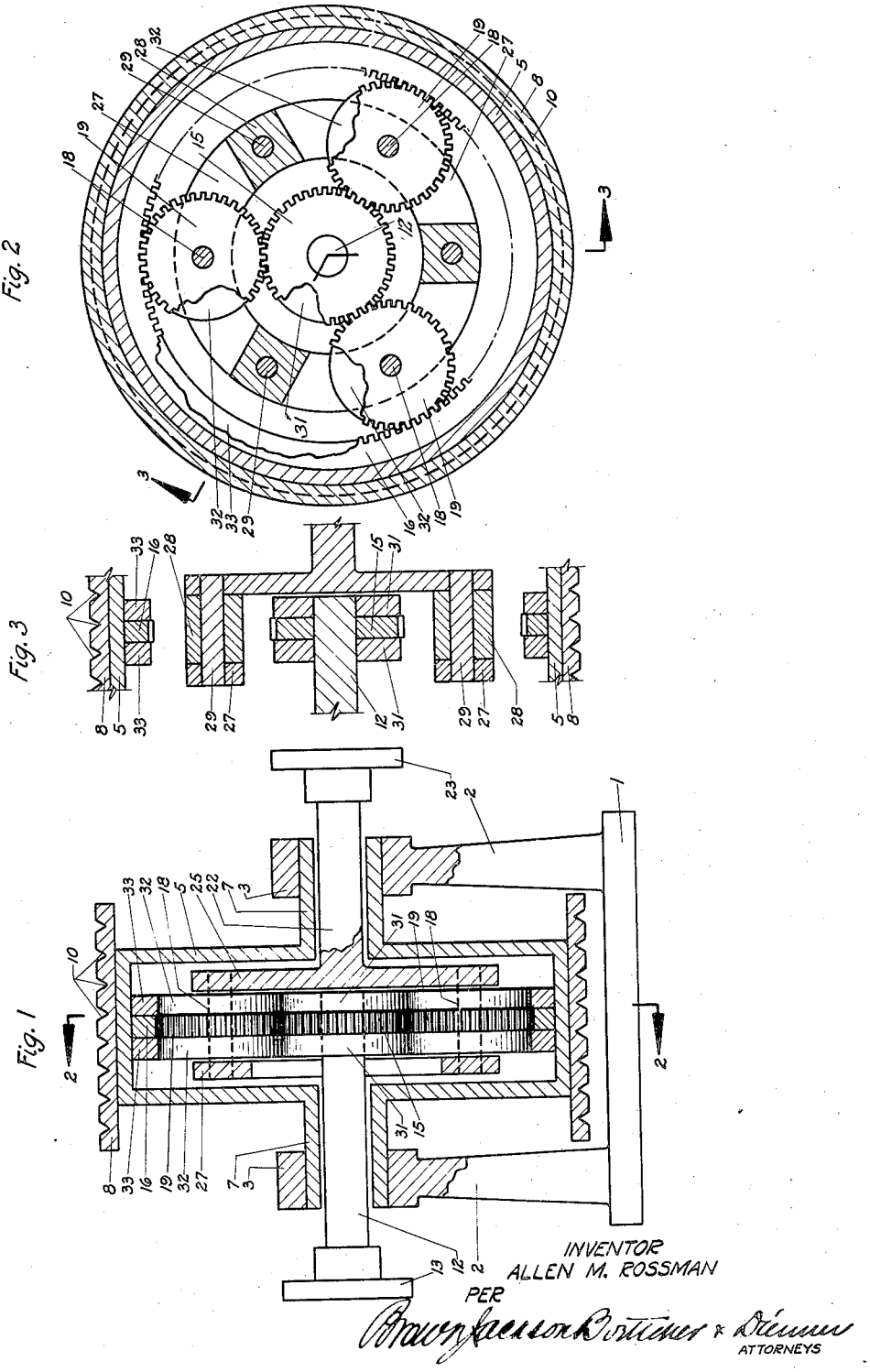

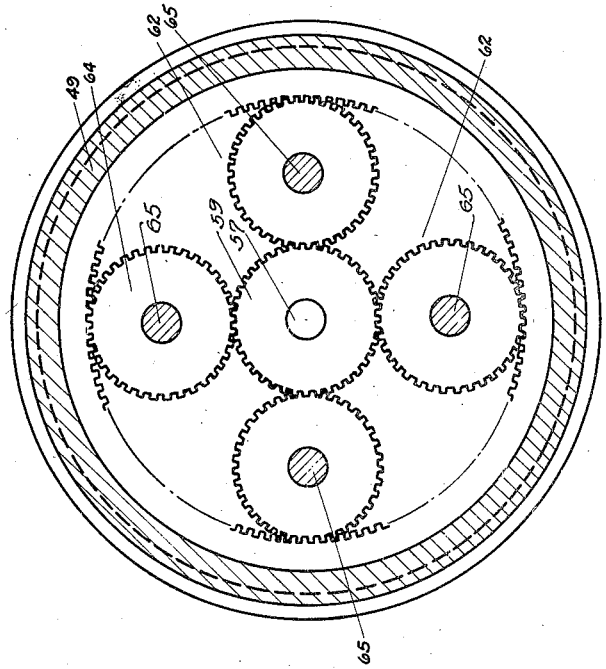
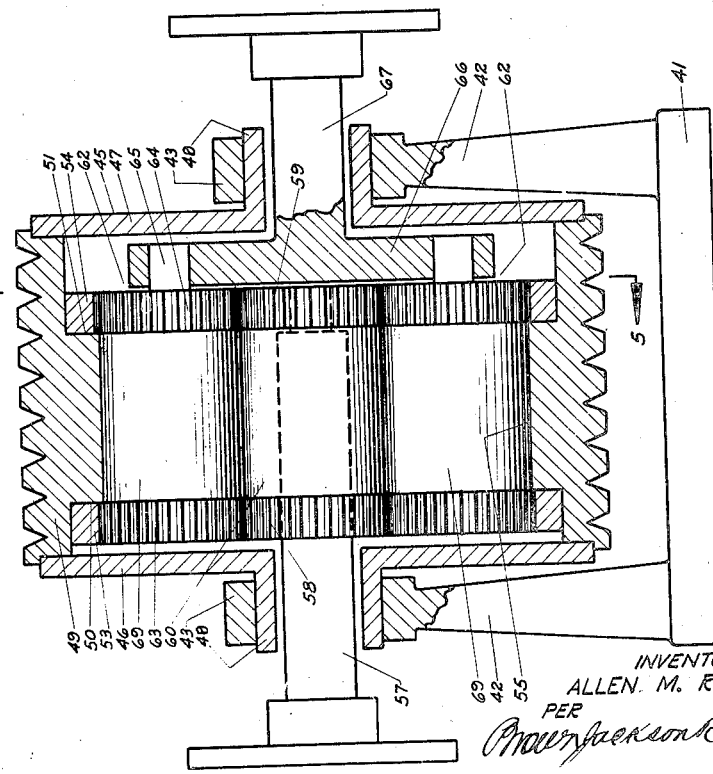

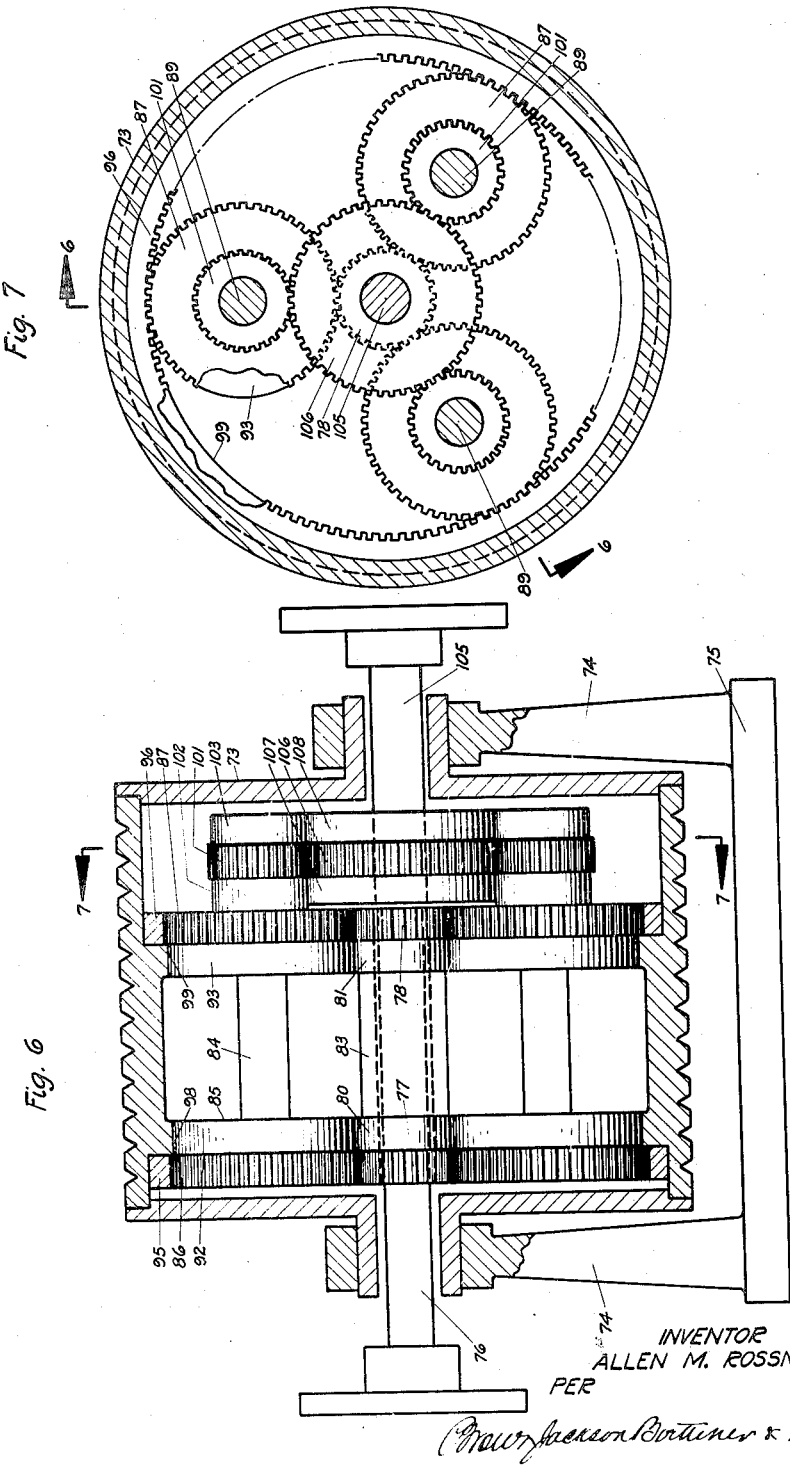

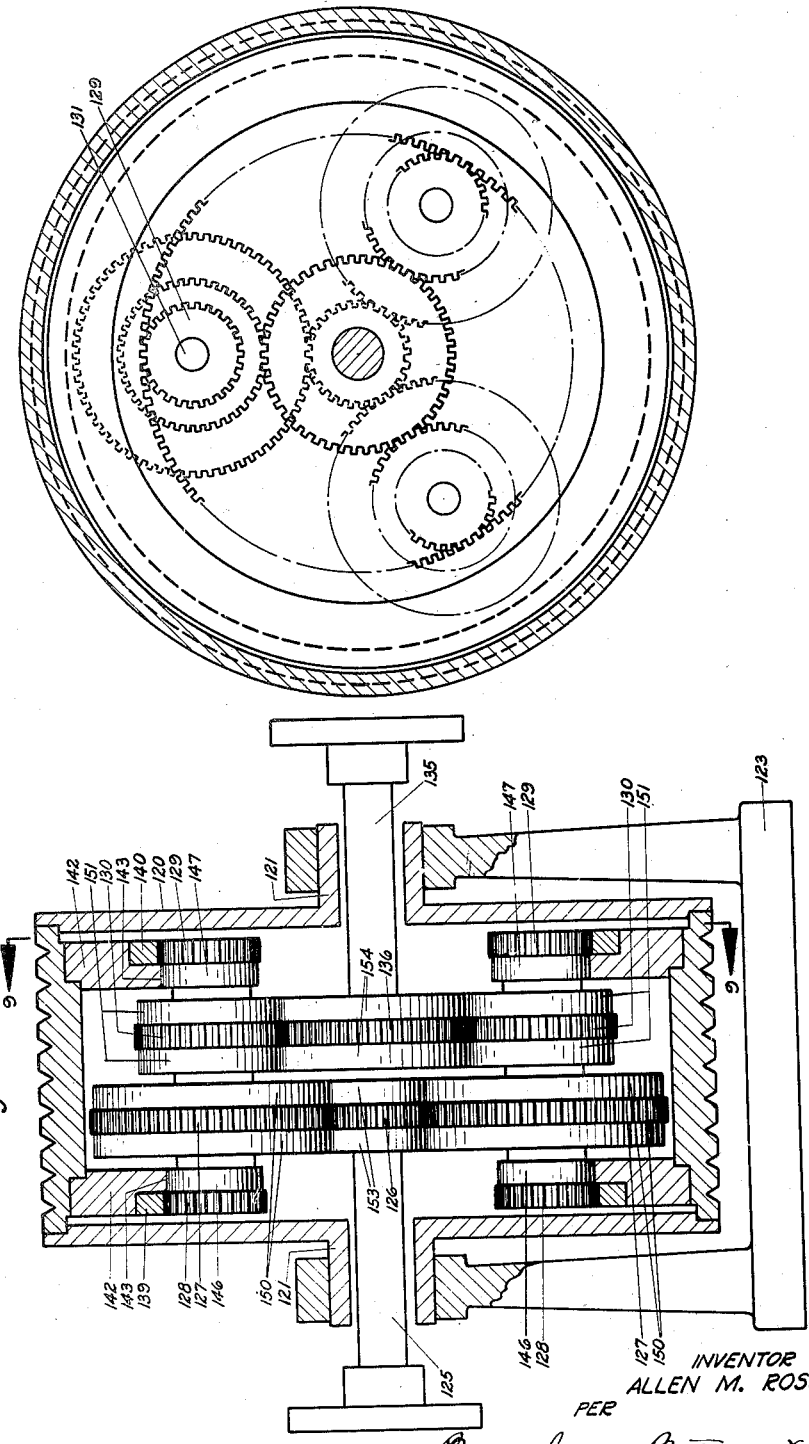

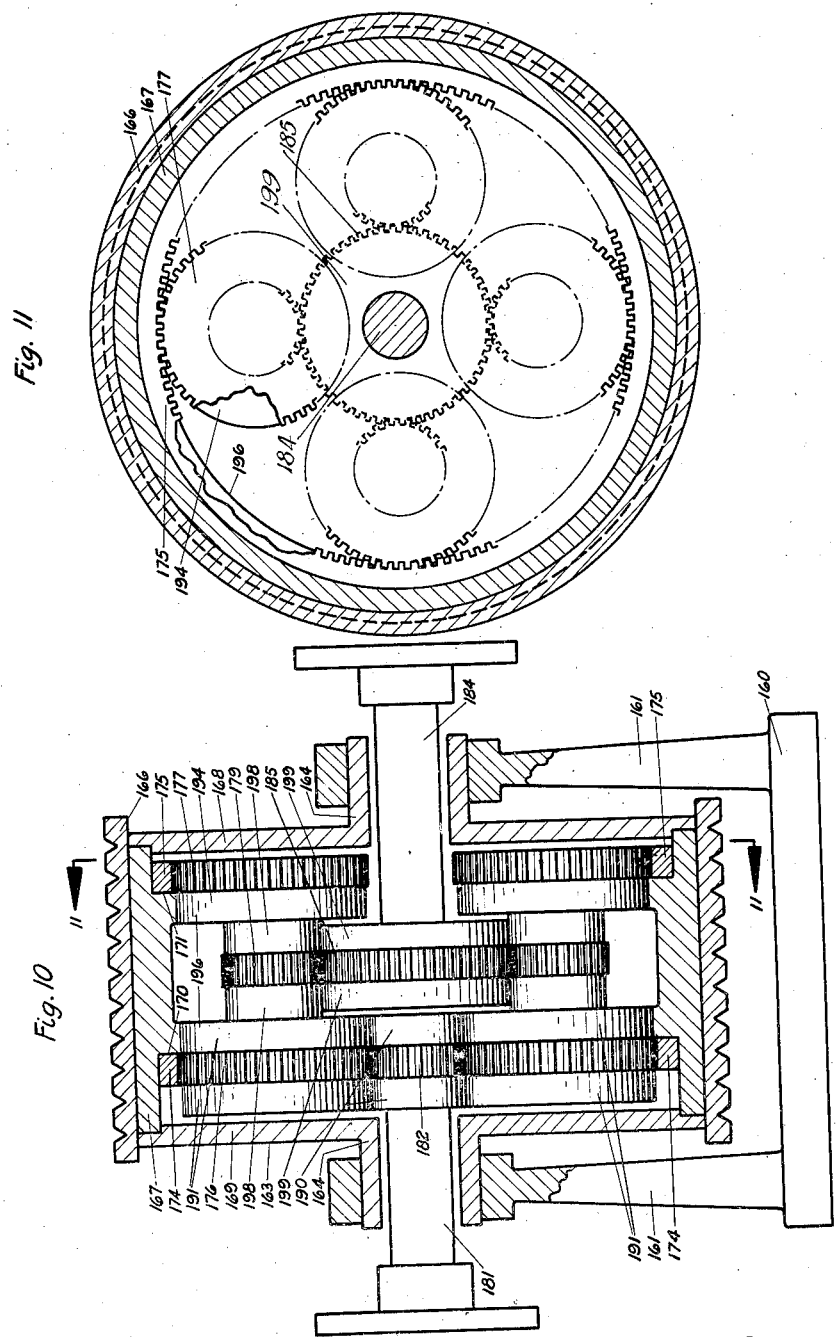

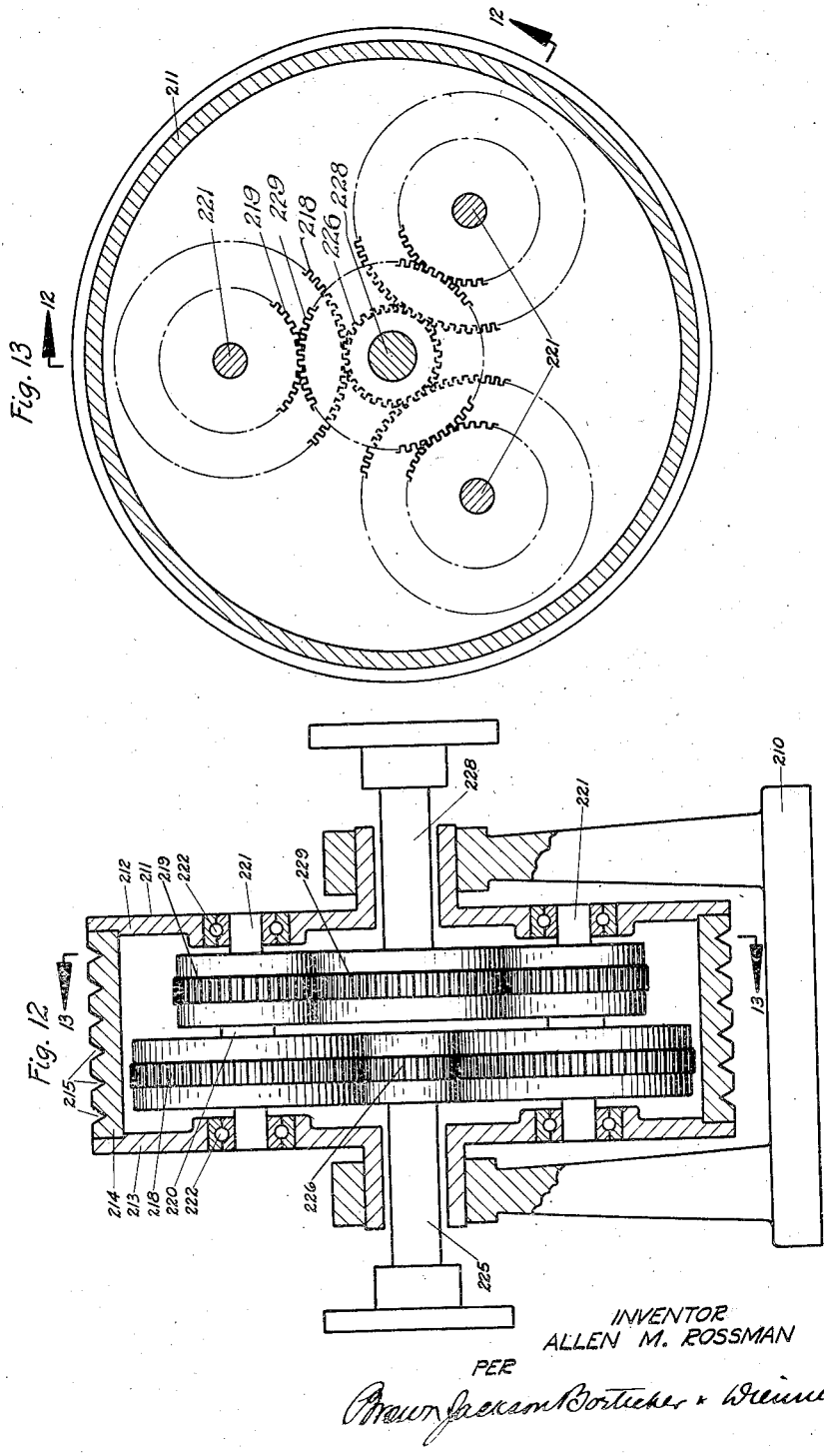

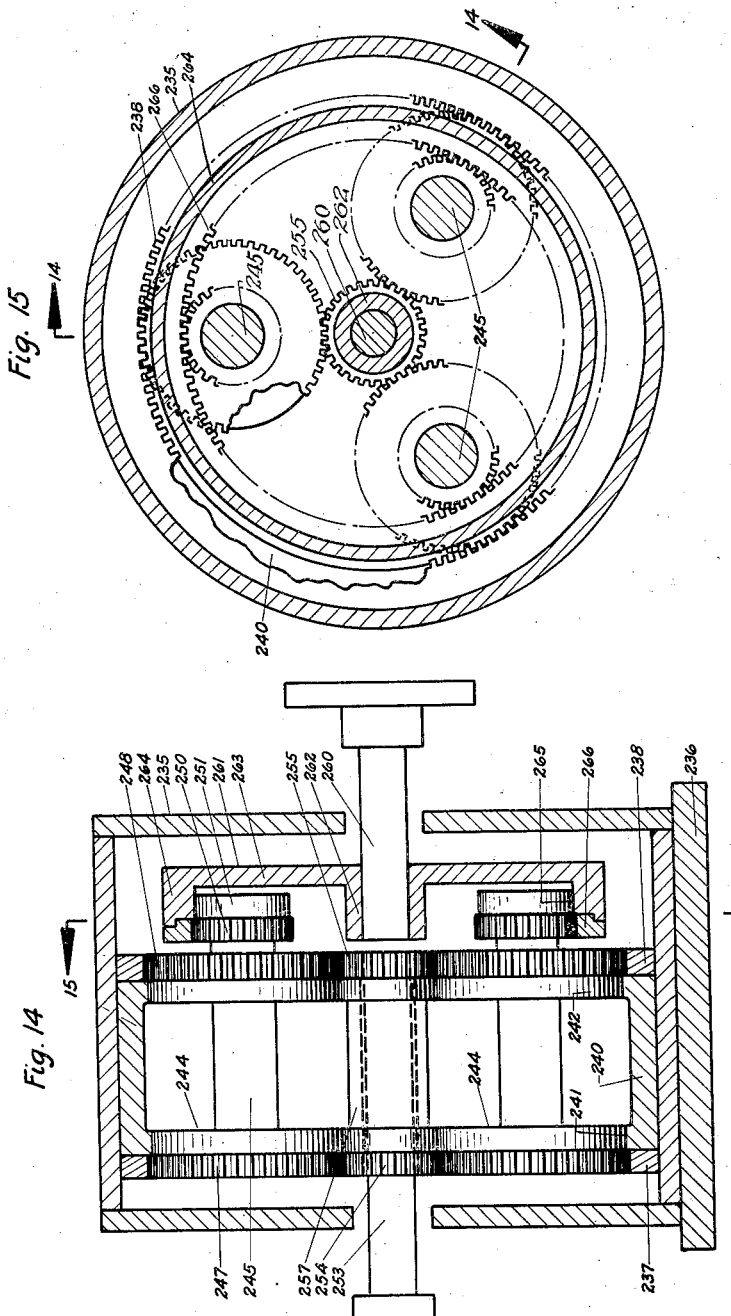

INVENTOR
ALLEN M. ROSSMAN
PER
ATTORNEYS

Aug. 14, 1934.  A. M. ROSSMAN  1,970,251
MECHANICAL MOVEMENT
Filed Feb. 4, 1932  12 Sheets-Sheet 12
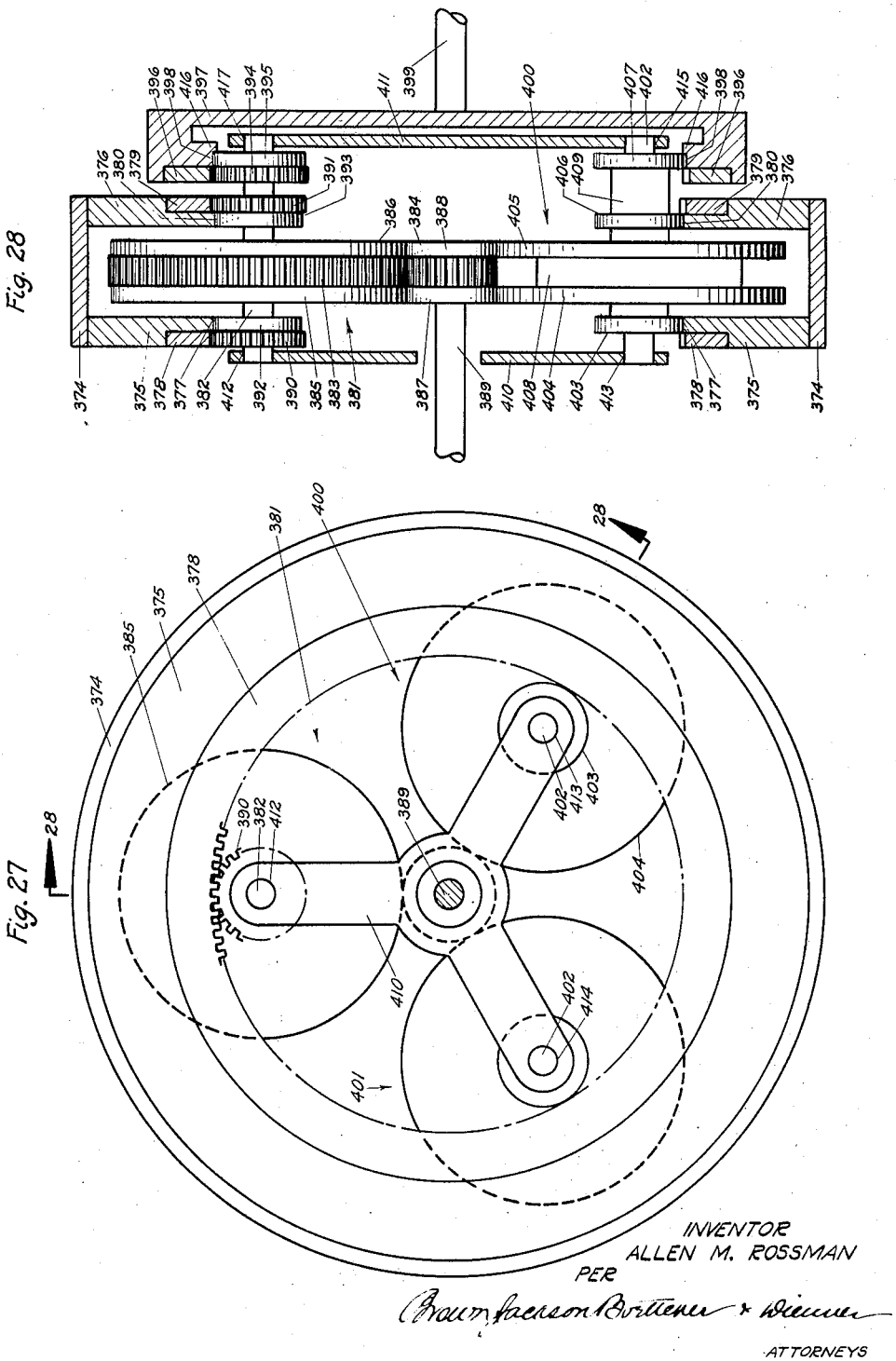
INVENTOR
ALLEN M. ROSSMAN
PER
ATTORNEYS Patented Aug. 14, 1934

1,970,251

UNITED STATES PATENT OFFICE 1,970,251

MECHANICAL MOVEMENT

Allen M. Rossman, Chicago, Ill., assignor to Rossman Engineering Company, a corporation of Illinois Application February 4, 1932, Serial No. 590,866

20 Claims. (Cl. 74—34)

The present invention relates generally to a transmission gear drive assembly which is adapted for many different kinds of installations and which embodies, as one specific feature thereof, a planetary gear assembly in which the majority or all of the bearings or journals of the usual shaft type are eliminated.

The present application is a continuation in part of two of my copending applications, namely, an application filed April 23, 1929, Serial No. 357,540, for a Drive, now Patent No. 1,828,947, and an application filed May 4, 1929, Serial No. 360,400 for Adjustable speed drive adapted for traction purposes, now Patent No. 1,828,948.

More specifically, the present invention is principally concerned with the provision of a planetary gear differential transmission involving one or more sun gears, a plurality of planet units or assemblies, and one or more orbit or internal gears, all enclosed in a housing or casing which may or may not be rotatable. The principal object of the present invention is the construction and arrangement of these parts so that they are supported one on the other for rolling contact with practically no journals or sliding contacts whatsoever.

In the preferred constructions, circular discs of the same diameter as the diameter of the pitch circles are mounted concentric with the axis of and adjacent to each gear in such a manner that the discs hold each gear at the proper distance from and in perfect alignment with every other gear, provide rolling bearing surfaces for all gears and pinions, and lock the entire mechanism together.

The planet gears meshing with the orbit gears keep the shafts of the planet units always parallel to the main axis of the assembly while the associated disc members keep them in their proper orbits. Consequently, the cage which is an essential part of the ordinary type of planetary gear transmissions is not needed and is eliminated, together with the usual cantilever supported stub shafts and the like and the associated journal bearings.

By virtue of this construction exceptionally heavy loads can be transmitted without excessive friction losses and, in addition, the parts may be adequately lubricated at all times by a simple splash system. Furthermore, since the various gears and associated parts are maintained in alignment by members operating in rolling contact there is little if any wear so that there is no need for taking the transmission out of the operating line for the purpose of making adjustments to bring the shafts and the like back into alignment as is necessary with the transmission devices of the prior art in use at the present time.

Further, it is the object of the present invention to provide a planetary gear transmission in which all close fitting by jig or hand to insure proper distances between shaft centers is eliminated, the accurate machine work which is required to insure a close fit and well aligned assembly being accomplished on the lathe or other machine which turns out the unit parts. In a gear transmission constructed according to the principles of the present invention, if the unit parts are machined to the correct dimensions, these parts must fit together properly in the final assembly without any extensive or tedious hand fitting or adjustment.

It is also the purpose of the present invention to provide a planetary gear transmission with which, with but a few fundamental design forms, a range of speed ratios wide enough to meet practically all commercial demands may be had by merely varying the gear ratios. The present invention finds its greatest field of usefulness when embodied in a physical structure particularly adapted to transmit heavy loads, such as those encountered in driving rolling mill apparatus, paper mill machinery, various types of hoists, elevators and the like and other similar installations. In these cases where heavy loads are encountered it is particularly essential to keep down friction losses as much as possible and also to eliminate as much as possible taking the unit out of operation for the purpose of making adjustments.

It is to be understood, however, that the principles of the present invention can be embodied in drives and gear reductions adapted for entirely different conditions. In this connection electric clocks and watt hour meters may be mentioned. While it may be that in this type of instrument losses due to friction and the like are not controlling it is nevertheless necessary to provide a gear transmission which is simple and which may be easily assembled without extensive hand operations or accurate spacing of gear shafts and the like. In such an assembly as contemplated by the present invention and in which all contact surfaces except tooth contacts are practically frictionless rolling contacts the correct alignment of all parts will be permanently maintained without service or adjustment. It is probable that this system of gearing would operate for a long time without any lubrication at all.

While I have outlined above some of the generic features of the present invention, other objects and advantages of my invention will be apparent to those skilled in the art after a consideration of the following detailed description of the preferred structural embodiments, taken in conjunction with the accompanying drawings, in which:

Figure 1 is a vertical section through a three-way planetary gear transmission embodying the principles of the present invention and illustrating the construction of the corresponding transmission assembly shown in my two copending applications referred to above;

Figure 2 is a cross-sectional view taken substantially along the line 2—2 of Figure 1;

Figure 3 is a cross-sectional view taken at right angles to the cross-section of Figure 2 and corresponding to a view along the line 3—3 of Figure 2;

Figure 4 is a cross-sectional view of a slightly modified form of planetary gear transmission in which the roller cylindrical surfaces which carry the radial loads and which maintain the various gears in proper position are mounted between the two sets of gears;

Figure 5 is a cross-section taken along the line 5—5 of Figure 4;

Figure 6 shows a modification wherein the journal bearings of the planet units have been eliminated and the final driven shaft is connected with the planet units through gears having members providing rolling contact;

Figure 7 is a cross-section taken along the line 7—7 of Figure 6;

Figures 8 and 9 are cross-sections showing a type of planetary gear assembly employing two sun gears and a plurality of planet gear units, the gears being provided with means operating in rolling contact to maintain the various gears in position;

Figure 23:
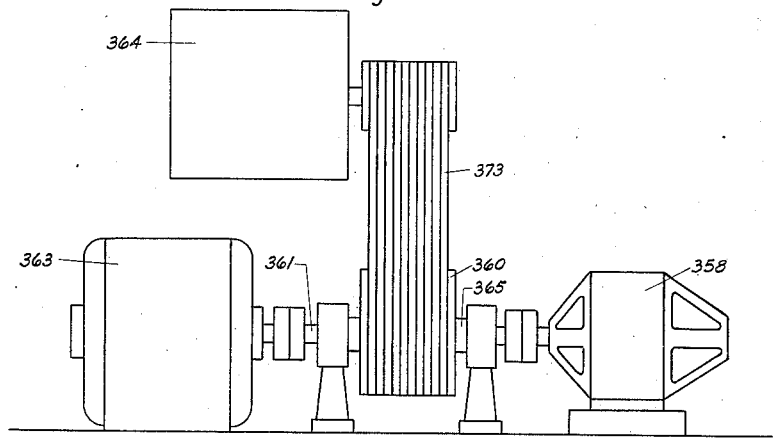
Figure 24:
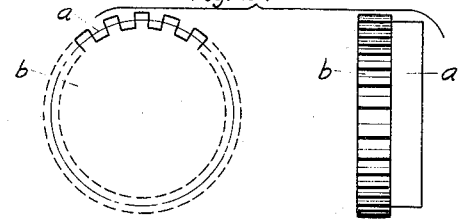
Figure 25:
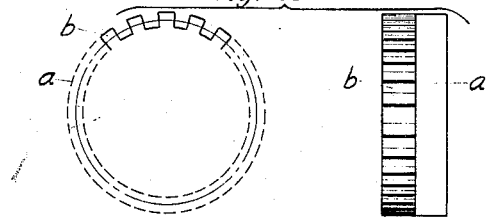
Figure 26:
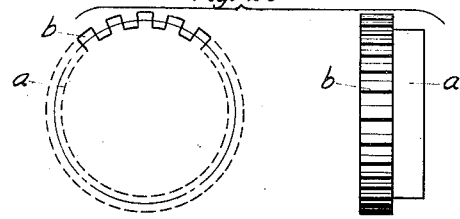

Figures 10 and 11 also show a planetary gearing of the two sun type but one which is somewhat simpler than the construction illustrated in Figures 8 and 9 in that each planet unit comprises only three gears whereas the construction shown in Figures 8 and 9 employs four gears in each planet unit;

Figures 12 and 13 illustrate a modified form of the two sun gear type of planetary transmission, and in these figures the planet units are journaled to the rotatable casing but the planet and sun gears are held in position by means providing rolling contact;

Figures 14 and 15 illustrate the application of the principles of the present invention to a planetary gear construction somewhat similar to that shown in Figures 6 and 7 in that the sun gears mesh directly with the planet gears which, in turn, are in mesh with the internal ring gears carried by the casing, but in Figures 14 and 15 the casing is shown as stationary and the final drive involves an internal gear meshing with pinions on the planet shafts with the result that a greater gear reduction is obtained;

Figures 16 and 17 also illustrate a construction wherein the casing is stationary and the final drive is taken off through an internal gear meshing with pinions carried on the planet shafts, but in Figures 16 and 17 a further gear reduction is obtained by having only one sun gear meshing with a large planet gear in each planet unit, the planet units including relatively small pinions meshing with ring gears carried on the stationary housing;

Figures 18 and 19 illustrate the principles of the present invention as embodied in a planetary gear transmission in which a gear reduction of considerable magnitude is obtained, as by employing relatively small pinions and relatively large gears for the planet units and for the final driven internal gear member;

Figure 20 is a more or less diagrammatic view illustrating one method of installing my improved planetary gear transmission drive between an electric motor and the load, Figure 20 illustrating the type of planetary transmission employing a stationary casing or housing;

Figure 21 shows the application of my improved planetary gear transmission employing a rotatable casing wherein an AC motor and a DC motor are both utilized to drive the load, this method of drive being clearly disclosed and claimed in my copending applications referred to above;

Figure 22 is similar to Figure 21, the only difference being that the casing of the planetary gear unit is connected to one of the motors through gears instead of ropes or belts as shown in Figure 21;

Figure 23 shows a slightly different positioning of the two motors and the load, the principle of operating being, however, practically the same as in Figures 21 and 22;

Figures 24 to 26 illustrate various relations of the bearing or disc members; and Figures 27 and 28 illustrate an application of the principles of the present invention similar in effect to Figures 18 and 19, except that the gears on two of the planet members are omitted for the sake of simplicity, the correct angular spacing of the planet members of the assembly being maintained by means of keepers or side plates holding the ends of the planet shafts in bearings.

Referring now to Figure 1, the reference numeral 1 indicates a base or support to which is secured a pair of spaced standards 2 having journal bosses 3 at their upper ends. A casing or housing 5 is provided with tubular extensions 7 which are journaled in the upper ends of the standards 2 whereby the casing or housing 5 is supported for rotation. The casing 5 receives a circumferential pulley rim or flange 8 which in its face is provided with a plurality of V-shaped grooves 10 for the reception of a plurality of V-shaped driving belts. These V-shaped belts are adapted to be connected to a suitable source of power whereby the rotatable housing 5 may be driven, as will be explained more fully later.

The extensions 7 of the housing or casing 5 are tubular and are therefore arranged to receive shafts therein. For convenience in describing these parts one shaft will be assumed as the driving shaft while the other will be considered as the driven shaft, it being understood, however, that these assumptions are made only for purposes of illustration and are not to be considered as structural limitations since obviously either shaft may be the driving shaft or either shaft may be the driven shaft. The same is true of the rotatable housing 5 which itself may either be a driving element or a driven element, so far as the present invention is concerned.

The driving shaft is indicated by the reference numeral 12 and has at its outer end a coupling flange 13 or other suitable means whereby it may be connected to an electric motor or other suitable source of power. At its inner end the driving shaft 12, which is received within the tubular extension 7 of the casing 5, carries a gear or pinion 15 which acts as the sun gear of the planetary gear assembly to be described. The shafts and the sun gear 15 occupy a central or axial position with respect to the rotatable casing 5, as clearly shown in Figure 2, the rotatable casing or housing 5 carries an internal ring gear member 16 which occupies a position in the plane of the sun gear 15. A plurality of planet gear units are positioned in the plane of the sun gear 15 and between that gear and the internal gear member 16. Each planet gear unit comprises a planet shaft 18 and a planet gear 19, the latter being arranged to mesh with both the sun gear 15 and the internal ring gear 16. When arranged in this manner the internal ring gear 16 acts as an orbit gear for the planet gears which, when rotated by the sun gear 15, roll or revolve around the axis of the sun gear in an orbit corresponding to the ring gear member 15, as will be understood by those skilled in the art. As shown in Figure 2 three of such planet gear units are provided, but it is to be understood that a more or less number of such units may be provided as what may seem desirable.

The driven shaft is indicated by the reference numeral 22 and is arranged to be coaxial with respect to the driving shaft 12. Like the shaft 12 the driven shaft 22 is received within one of the tubular extensions 7 of the housing 5. At its outer end the driven shaft 22 is provided with a coupling flange 23 by which the load to be driven is connected with the driven shaft. At its inner end the driven shaft 22 carries a disc or bridging plate to which the various planet shafts 18 are preferably rigidly secured, although the present invention also contemplates journaling the planet shafts in the plate 25. For the purpose of holding the planet shafts 18 in proper axial position the other ends of these shafts are received within suitably formed apertures in a ring member 27 best shown in Figure 2. Where the planet shafts are preferably rigidly secured to the plate 25 and the reenforcing ring 27 these parts are rigidly fastened together whereby heavy imposed loads will not pull the shafts out of alignment. The planet gears 19 are journaled onto the planet shafts 18.

The plate 25 and the ring 27 are spaced the proper distance by spacing blocks 28 mounted between the plate 25 and the ring 27 and securely held by rivets or bolts 29 passing through the plate, blocks and ring.

The operation of the structure so far described is substantially as follows. Rotation of the sun gear 15 by the driving shaft 12 causes the planet gears 19 to roll around the toothed inner circumference of the ring gear 16 thus advancing their planet shafts 18 around the axis of the driving shaft 12 with a speed which is one half the linear speed of the teeth of the planet gears 19. The revolution of the planet shaft 18 causes the rotation of the plate 25 and the ring 27, but since the driven shaft 22 is rigidly secured to these parts the shaft 22 will therefore be driven. The ratio or mechanical advantage between the driving shaft 12 and the driven shaft 22 depends upon the gear ratios of the sun gear 15 and the planet gears 19. The larger the planet gears and the smaller the sun gear the greater will be the reduction between the driving shaft 12 and the driven shaft 22.

The above operation assumed that the casing 5 was held stationary. Let us now assume that the driving shaft 12 is held stationary while the casing 5 is rotated. Referring now to Figure 2 and remembering that the sun gear 15 is now held stationary, it will be seen that the rotation of the housing 5, say in a clockwise direction as viewed in Figure 2, will cause the planet gears 19 to roll around the perimeter of the stationary sun gear 15. This will cause the planet shafts 18 to be advanced in the same direction but at one half the linear velocity of the gear teeth on the ring gear 16. Thus, as the housing 5 is rotated the driven shaft 22 will be also rotated but at a slower speed.

As explained above, the principal feature of the present invention is the provision of means associated with the various gears and operating one against the other in rolling contact to space and maintain the various gears in proper position and also to take all radial loads imposed on the gears. One of the preferred structural embodiments carrying out this feature of the present invention includes cylindrical discs or cheek pieces having a cylindrical surface associated with each of the gears and preferably of a diameter practically exactly equal to the diameter of the pitch circle of the gear teeth. In Figure 1, I illustrate two of such members associated with the sun gear 15 and with each of the planet gears 19. The cylindrical members 31 associated with the sun gear 15 are preferably placed on opposite sides thereof and any means desirable may be utilized to secure these disc members 31 to the gear 15 or to the shaft 12 or both. The two discs associated with each of the planet gears 19 are indicated by the reference numeral 32 and these also are preferably placed on opposite sides of the gear 19. In addition, corresponding ring-like discs or cylindrical members 33 are associated with the internal ring gear 16, as best shown in Figures 2 and 3. The inner circumference of the discs or bearing rings 33 is substantially equal to the diameter of the pitch circle of the gear teeth on the internal gear member 16.

The various discs 31, 32 and 33 may be formed of any suitable material but preferably they are made of hardened metal so as to be able to take heavy loads without appreciable wear. Since these discs or roller bearing members are each of a diameter equal to the diameter of the pitch circle of the associated gear it will be apparent that when the sun gear and several planet units are assembled in proper relation these roller bearing members will be in tangential contact and will maintain the various gear teeth in exactly the right position. As will be apparent from Figure 1, these roller discs will serve as supporting means for the gears, one being supported on the other so that the entire assembly will be held in place. The several planet gear units will be supported upon the roller discs 33 and the sun gear 15 and the corresponding end of the shaft 12 will be carried upon the roller discs of the planet units. In this way the radial loads imposed upon the gears will be effectively resisted by these hardened roller members so that the thrusts arising from the transmission of forces will not be imposed upon journal bearings or similar structures. It is true that in Figures 1 to 3 the planet gear units are journaled upon the planet shafts 18 but otherwise there are no other journal bearings other than the bearings of the housing extensions 7 in the standards 2. The inner end of the driving shaft 12 is supported by virtue of the rolling contact 18 the discs 31 and the planet discs 32.

In this manner the transmission or differential gear is practically self-supporting.

Figures 4 and 5 illustrate a planetary gear transmission drive which is somewhat similar to that shown in Figures 1 to 3 described above.

In Figures 4 and 5, however, each of the planet gear units comprises two planet gears and roller or disc member therebetween, whereas in Figures 1 to 3 the planet units comprise one planet gear mounted between two roller or disc members. Also, in Figures 4 and 5 the planet units are themselves made longer so that the use of the retaining ring 27 shown in Figures 1 to 3 may be dispensed with.

In Figures 4 and 5 the reference numeral 41 indicates the base on which is mounted a pair of standards 42 provided with bearing bosses 43 at their upper ends which function in exactly the same manner as the corresponding parts 1, 2 and 3 shown in Figure 1. The housing 45 of Figures 4 and 5 is, however, slightly different in form from that shown in Figures 1 to 3. The housing 45 comprises a pair of side plates 46 and 47, each one of which is provided with a tubular extension 48 which has bearing support in the upper ends of the standards 42. The housing 45 is completed by a grooved rim 49 which is secured in any desired manner to the plates 46 and 47. The rim 49 is provided with a pair of shouldered recesses 50 and 51 which receive a pair of internal ring gear members or orbit gears 53 and 54, respectively. These orbit ring gears are suitably secured to the grooved rim 49 in any desired manner as by stud bolts or the like. As will be apparent from Figure 4, the orbit gears are spaced apart a substantial amount leaving a surface therebetween which is machined or otherwise formed to provide a cylindrical roller bearing surface which functions in exactly the same manner as the bearing discs 33 of Figure 1.

The driving shaft 57 carries two sun gears 58 and 59 secured thereto and spaced apart exactly the same amount as the orbit ring gears 53 and 54 so that the orbit gears and the sun gears occupy positions in the same planes. A roller or cylindrical member 60 is secured to the driving shaft 57 and to the sun gears 58 and 59 and is so constructed as to have a diameter equal to the diameter of the pitch circle of the two sun gears 58 and 59, these sun gears being identical in diameter and pitch.

A plurality of planet gear units are mounted between the sun gears and the orbit gears, there being four planet gear units as is shown in Figure 5, but it is to be understood that a greater or less number of these units may be used when and if desirable. Each of the planet gear units is indicated in its entirety by the reference numeral 62 and each comprises a pair of spaced apart planet gears 63 and 64 journaled upon a planet shaft 65 which is rigidly carried by a rotatable plate member 66, the latter being secured to or formed as a part of a driven shaft 67. A cylindrical member 69 is mounted on the planet shaft 65 and secured to the planet gears 63 and 64. The diameter of the cylindrical member 69 is equal to the pitch diameter of the planet gears 63 and 64. Thus, when the transmission is properly assembled and the various gears properly in mesh the cylindrical or load bearing members 55, 60 and 69 are in contact one with the other, the sun gears 58 and 59 and the inner end of the driving shaft 57 being supported upon the cylindrical members 69 forming a part of each of the planet gear units, while the latter units are supported by virtue of the rolling contact between the several cylindrical members 69 and the cylindrical surface 55.

The operation of this planet gear transmission is substantially the same as the operation of the one shown in Figures 1 to 3. When the housing 45 is held stationary the rotation of the driving shaft 57 rotates the sun gears 58 and 59 simultaneously, and this causes the planet gears 63 and 64 to roll around the stationary orbit gears 53 and 54 thus advancing the planet shafts 65 around the axis of the aligned shafts 57 and 67 with a linear velocity which is equal to one half of the linear velocity of the sun gears 58 and 59. When the driving shaft 57 is held stationary and the housing 45 is made the driven element the planet units roll about the stationary sun gears 58 and 59, the planet gear shafts 65 being advanced around the axis of the shafts 57 and 67 with a linear velocity which is equal to one half of the linear velocity of the teeth of the orbit gears 53 and 54.

While I have described the shaft 57 and the housing 49 as being adapted to form the driving element it is to be understood, of course, that the member 67 carrying the planet shafts 65 may be the driving element, either the housing 45 or the shaft 57 thus becoming the driven element. The grooves in the rim 49 are adapted to receive driving means such as V-shaped ropes or belts. Because of the substantial length of the cooperating cylindrical members it is unnecessary to provide a reenforcing ring in this transmission such as is desirable in the modification illustrated in Figures 1 and 2. The transmission shown in Figures 4 and 5 is capable of transmitting loads of considerable magnitude due to the substantial width of the rolling surfaces in contact one with the other.

In the embodiments described above the planet gears were journaled upon planet shafts carried by a cage structure to which the driven shaft was secured. The early part of this specification set out a few of the advantages flowing from the elimination of shaft bearings. Figures 6 and 7 illustrate one way of avoiding the journal bearings of the planet gears on the planet shafts. In this modification, as in Figures 1 and 4, the housing 73 is rotatable and is journaled for rotation in bearings at the upper ends of the standards 74 secured to a base 75. The driven shaft 76 carries two sun gears 77 and 78 which are spaced apart a substantial amount and this shaft is also provided with bearing rollers 80 and 81 associated respectively with the sun gears 77 and 78. As contrasted with the structure of Figure 4, these roller members 80 and 81 are more in the form of discs having relatively narrow bearing surface. The sun gears and associated bearing discs are maintained in proper spaced relationship by a spacing sleeve 83. The sun gears and the discs are secured to the shaft 76, and the spacing sleeve 83 may also be secured to this shaft if desired, although this is not essential.

Each of the planet units 85 includes separated planet gears 86 and 87 meshing respectively with the sun gears 77 and 78. The planet gears 86 and 87 are secured to a planet shaft 89 which also carries roller discs 92 and 93 associated respectively with the planet gears 86 and 87 and operating in rolling contact with the discs or rollers 80 and 81 when the planet and sun gears are in mesh. A pair of internal rings or orbit gears 95 and 96 are secured to the rim portion of the housing 73 which, like the illustrated embodiment shown in Figure 4, is provided with shouldered recesses to receive these internal gear members. These members are spaced apart the same distance as the sun gears and the planet gears just mentioned.

The housing is formed intermediate the internal gear members 95 and 96 with inwardly facing radial ridges 98 and 99 which serve as ring discs or roller surfaces to receive the several planet discs 92 and 93. The surfaces 98 and 99 are cylindrical and have diameters equal to the diameter of the pitch circle of the internal gear members 95 and 96, and in a corresponding manner the roller discs 92 and 93 have a diameter equal to the diameter of the pitch circle of the planet gears 86 and 87 and the discs or rollers 80 and 81 also have a diameter equal to the diameter of the pitch circle of the sun gears 77 and 78. By virtue of this construction the sun gears are supported upon the roller discs of the planet gear units and the latter are, in turn, supported upon the roller surfaces of the housing 73, these supporting parts all operating in substantially frictionless rolling contact.

In order to provide a connection between the different planet units and the driven shaft without the inter-position of any journal shaft bearings I provide each of the planet shafts 89 with a planet pinion 101 securely fastened thereto and flanked on either side with roller discs or cheek pieces 102 and 103, each of the latter being of a diameter equal to the diameter of the pitch circle of the small planet gear or pinion 101. As shown in Figure 6 this additional planet gear 101 is positioned on the planet shaft 89 beyond either of the relatively large planet gears 86 and 87. The driven shaft 105 carries at its inner end a sun gear 106 secured thereto and, like the planet gear 101, is flanked on either side by roller discs 107 and 108. These disc members are of a diameter equal to the diameter of the pitch circle of the sun gear 106 so that when the gears 101 and 106 are in mesh the discs 102 and 103 contact tangentially with the discs 107 and 108. Since there are three of the planet units provided with above described set of roller members the inner end of the driven shaft 105 carrying the second sun gear 106 is supported in place without any journal bearings of any kind whatsoever.

The operation of this embodiment is substantially the same as the operation of the above described structures. Rotation of the sun gears 77 and 78 cause the planet gears 86 and 87 to roll around the ring gears 95 and 96, assuming that the housing 73 is the element which is held stationary. In this modification, as compared to the modifications shown in Figures 1 and 4, the driven shaft 105 does not rotate with the same angular velocity as the planet units revolve in their orbits about the axis of the shafts. In this case the driven shaft 105 rotates at a somewhat greater speed due to the fact that as the planet units rotate on their own axes the planet pinions 101 also rotate which advances the second sun gear 106 an amount, dependent upon the gear ratio between the gears 101 and 106, which imparts an additional rotation to the sun gear 106 and the driven shaft 105 over and above the amount of rotation imparted thereto by the revolution of the planet units in their orbits. The various roller and disc members maintain the various gears in proper alignment and in their proper position in the plane of their orbits without any journal or shaft bearings whatsoever, the hardened disc members operating one against the other in practically frictionless rolling contact.

Figures 8 and 9 illustrate another embodiment of the present invention and which differs from the above described constructions in several important respects, the principal one of which is that the planet gears which mesh with the orbit ring gears are not the gears with which the sun pinion or pinions on the driving shaft mesh as in the above described embodiments. In this case, as best shown in Figure 8, the casing or housing 120 is provided with tubular extensions 121 by which the housing is supported for rotation on the base 123. The driving shaft 125 carries a relatively small sun gear 126 at its inner end, and this small sun gear meshes with the relatively large planet gear 127 which forms a part of each of the several planet units. Each planet unit comprises four gears, namely, the gear 127 just described, two small planet gears or pinions 128 and 129, and a somewhat larger planet gear 130. All of these gears are rigidly secured together as by being mounted on the same planet shaft 131 or by any other means desired.

The driven shaft 135 carries at its inner end a second sun gear 136 which occupies a position in the plane of the planet gears 130 with which gears the sun gear 136 is in mesh. The driving and driven shafts 125 and 135 are axially aligned, as in the previously described modifications, and each occupies a position substantially centrally of the rotatable housing 120 and received within but not contacting with the tubular extensions 121.

The smaller planet gears of each planet unit are of the same diameter and are in mesh with a pair of orbit gears 139 and 140 fixed to rings or plates 142 carried by the grooved rim of the rotatable housing 120. The plates 142 are formed to provide a rolling surface 143 for each of the internal orbit gears and which is of a diameter exactly equal to the diameter of the pitch circle of these two orbit gears. Since the small planet gears 128 and 129 are equal in diameter and pitch it is necessary therefore that the internal gears 139 and 140 also be of the same size, and this also applies to the modifications previously described. This relation is not absolutely essential, however, since it is conceivable, and the same is to be considered as contemplated by the present invention, that one of the planet gears 128 or 129 may be larger than the other planet gears in which the cooperating orbit gear 139 or 140 would also have to be of a different size, and if the same gear ratio be maintained between these two sets of cooperating gears the axis of the several planet gears will always be maintained in proper alignment in the same way that they are maintained in proper alignment when the gear members 128, 129, 139 and 140 are of the same size. Each of the planet gears 128 and 129 of the several planet units has a roller member or cheek piece 146 and 147 associated therewith and positioned in the planet unit so as to have rolling contact with the roller surfaces 143.

Circular discs or cheek pieces 150 and 151 are associated, respectively, with the other two planet gears 127 and 130, and these discs are of the same diameter as the pitch diameter of the gears with which they are associated. The same is true of the cooperating sun gears 126 and 136, these sun gears having pitch circle discs 153 and 154 which are arranged opposite, respectively, the pitch circle discs 150 and 151. These various pitch circle disc members hold each gear at the proper distance from and in perfect alignment with every other gear, provide rolling bearing surfaces for all gears and lock the entire mechanism together, as explained above in connection with the previously described embodiments. The planet gears meshing with the internal orbit gears keep the planet shafts always parallel with respect to the axis of the aligned shafts 125 and 126 which forms the main axis of the entire assembly, while the disc members associated with the gears keep them in their proper orbits. Consequently, the cage which is an essential part of the present type of planetary gear drives is not needed in my construction and is entirely eliminated therefrom together with all problems involving the proper centering of the stub shafts of the cage during assembly, together with those problems arising because of misalignment of the stub shafts in service due to the eccentric loading and consequent distortion of the supporting cage, bearing lubrication and bearing wear.

The operation of this type of self-supported planetary gear drive is substantially the same as the operation of the planetary drives described above. The ratio or mechanical advantage, however, in this modification is somewhat different, principally because of the gear reduction between the driving sun gear and the planet gears which mesh with the orbit gears of the casing. Assuming that the casing or housing 120 of Figure 8 is held stationary, it will be seen that the rotation of the driving shaft 125 will rotate the sun gear 126 which, in turn, will cause the planet gear units to revolve in their orbits around the orbit gears 139 and 140. This motion or revolution will, however, be comparatively slow as compared with the motion of the planet gear units in the above described planet gear units because, first, of the gear reduction effected by the small sun gear meshing with the relatively large planet gear 127 and, in the second place, because of the relatively small planet gears 128 and 129 meshing with the large orbit gears 139 and 140. The rotation of the planet gear units about their own axes and their revolution about the axis of the shafts 125 and 135 will cause the rotation of the driven shaft 135 at a speed which is dependent upon the gear ratio between the planet gears 130 and the second sun gear 136.

In this connection it is to be noted that the structure shown in Figure 8 is one which is readily adaptable to secure a range of speed ratios between the driving and driven shafts wide enough to meet practically all commercial demands. By merely changing the ratios of the two sun gears with respect to their corresponding planet gears many different speed ratios can be obtained without changing the ratio between the small planet gears 128 and 129 and the orbit gears 139 and 140. Obviously, of course, where these gear ratios are also changed a further change of speed ratios are obtainable.

Figures 10 and 11 illustrate a construction which is similar to that shown in Figures 6 and 7 except that the differential pinion on each of the planet gear shafts is mounted between the planet gears, but like Figures 6 and 7, Figures 10 and 11 show a planetary gear drive of what I term the two sun type, that is, the driving shaft rotates one or more sun gears which drive the planet gears and the latter, or means associated with them, drive a second sun gear or gears secured to the driven shaft. The reference numeral 160 indicates the base or support having upright standards 161 in the upper ends of which the rotatable housing or casing 163 is journaled, as by tubular extensions 164 as in the previously described embodiments. In this case the grooved rim 166 is separate from the rim 167 of the housing 163, the side plates 168 and 169 of the latter being secured to the rim 167 in any desired manner.

The casing rim 167 is provided with shouldered recesses 170 and 171 in which are mounted internal ring gears or orbit gears 174 and 175 with which the two large planet gears 176 and 177 of each of the planet units mesh. Each of the planet units also includes a relatively small planet gear or pinion 179 which, as best shown in Figure 10, is mounted between the two relatively large planet gears 176 and 177.

The driving shaft 181 is received within the tubular extension 164 and carries at its inner end a single sun gear which meshes with the planet gear 176 of each of the planet units. The driven shaft 184 is provided with a second sun gear 185 at its inner end. The second sun gear 185 is somewhat larger than the sun gear 182 and when properly assembled occupies a position between the planet gears 176 and 177 and meshes with the planet pinions 179. Thus as the sun gear 182 is rotated the planet units roll about the orbit gears 174 thus carrying with them the planet pinions 179. The second sun gear 185 is rotated by the advance of the planet units and also by the rotation of these units about their own axes.

Roller discs 190 are mounted on the driving shaft 181 on either side of the sun gear 182 and are of a diameter equal to the diameter of the pitch circle of the driving sun gear. These roller discs are in contact with a similarly formed roller disc 191 secured to the planet shafts and mounted on either side of the planet gears 176. Each of the other planet gears 177 is also provided with a pitch circle disc 194, but in this case only one of such discs is associated with each of the planet gears 177. The roller disc 194 and the inner one of the roller discs 191 of each of the planet units have rolling contact with the bearing ring surfaces 196 which are formed on the interior of the housing rim 167 and which have a diameter substantially equal to the diameter of the pitch circle of the internal ring members 174 and 175. By virtue of the spaced apart relation of the planet gears 176 and 177 and the associated bearing discs 191 and 194 operating against the bearing rings 196 each of the planet units are maintained in proper aligned relation.

A pair of rollers 198 are also secured to the planet shaft on either side of the planet pinion 179 and have a diameter equal to the pitch circle of the planet pinion. These rollers operate against pitch circle discs 199 secured to the driven shaft 184 and on opposite sides of the second sun gear 185. In this case the inner end of the driven shaft is supported upon the rollers 198 of the planet units and the inner end of the driving shaft 181 is carried by the disc members 191 of the planet units, the planet units themselves being carried above the bearing surfaces 196.

The above description of the modification shown in Figures 5 to 11 relates to planetary differential gear drives of the two sun type wherein all of the parts are supported in practically frictionless rolling contact except the journal supports for the housing itself, whereas Figures 1 to 5 show modifications wherein some of the parts are arranged for journal support other than the supports for the housing. In the case of Figures 1 to 5 it was the planet units which were journaled upon shafts carried by the driven shaft. In Figures 12 and 13 the planet units are carried by journals, not on the driven members, but on the housing itself, the driving and driven shafts each having a sun gear. The embodiment illustrated in Figures 12 and 13 is therefore of the two sun type although all of the parts are not supported for rolling contact. In Figures 12 and 13 the reference numeral 210 indicates the base or support in which the rotatable housing or casing 211 is journaled. The housing 211 comprises side plates 212 and 213 connected together by a grooved rim 214 having grooves 215 for the reception of driving belts or the like. In this construction the planet units each include a large planet gear 218 and a smaller planet gear 219 secured together by a connecting sleeve 220. The planet gears are secured to a planet shaft 221 which is journaled in the side plates 212 and 213 of the housing by ball bearings 222 or equivalent means. The driving shaft 225 carries a small sun gear 226 which meshes with the large planet gears 218, and the driven shaft 228 carries a large sun gear 229 meshing with the small planet gears 219. As in the previously described modifications, circular discs or bearing members of the same diameter as the pitch circle of the associated gear are mounted concentric with the axis of and adjacent to each of the sun and planet gears in such a manner that they hold each gear at the proper distance from and in alignment with every other gear, and the discs provide rolling bearing surfaces for all of the gears and lock the entire assembly together. In this case it is the driving and driven shafts which are supported by the rolling discs, the other parts being supported by more or less conventional means.

It is to be observed that in all of the above described modifications the housing for the assembly is rotatably mounted and is provided with a rim particularly adapted for the reception of a belt or belts or similar driving means. In effect, therefore, the above described structures are in the form of three-way transmission devices or planetary differential gears any one of the three principal elements of which may be connected with a load to be driven while the other two elements may be connected one with a source of power and the other held stationary or both may be connected to separate sources of power if desired. In the latter case where the two sources of power are connected with two of the elements to drive the load which is associated with the third or driven element the ultimate effect is to cumulatively impose upon the load the torques developed by the two separate sources of power, as will be more clearly set forth later and as referred to in my copending applications identified above.

It will be apparent, however, that the principles of the present invention in so far as they relate to the provision of a self-supported gear drive wherein a considerable number of shaft bearings and the like are eliminated may be embodied in a gear drive in which the housing is not rotatable but is stationary, such a gear drive being termed a two-way transmission drive. Figures 14 to 19 illustrate construction of this type.

Referring now more particularly to Figures 14 and 15, the reference numeral 235 indicates a stationary housing fixed to a base or support 236 in any desired manner. The housing 235 carries a pair of spaced apart internal ring gears 237 and 238, and between these ring gears or orbit gears is a circular member 240 having radial flanges 241 and 242 acting as pitch circle bearing rings for the gear members 237 and 238.

The planet gear units 244 each comprises a planet shaft 245 carrying a pair of planet gears 247 and 248 each of which has associated therewith a roller disc of a diameter equal to the diameter of the pitch circle of the planet gears. The planet shaft 245 of each of the planet units also carries a small planet gear or pinion 250 which also has its own pitch circle roller or disc 251 secured thereto. The driving shaft 253 is loosely received within the housing 235 and its inner end carries a pair of identical sun gears 254 and 255 which are properly spaced apart so as to mesh directly with the planet gears 247 and 248 which, as just mentioned, mesh with the internal ring gears 237 and 238. The sun gears 254 and 255 have pitch circle discs operating in rolling contact with the pitch circle discs of the planet gears 247 and 248, and the sun gears and discs are held in proper spaced relationship by a spacing sleeve 257.

The embodiment illustrated in Figures 14 and 15 is of a type which I term the sun and internal gear type in that the sun gear or gears are associated with the planet gears while the small planet gears or pinions actuate, not a second sun gear as is illustrated in the above described embodiments, but an internal gear member. One advantage of this particular arrangement is that a much greater gear reduction can be obtained between the two shafts in a small compact assembly than can be obtained in the two sun types. This advantage arises because where, in the two sun type of planetary gear reduction, the rotation of the planet units about their own axes imparted to the driven gear an additional rotation over and above the rotation occasioned by the bodily advance of the planet units in their orbits, the rotation of the planet units about their own axes in the sun and internal gear type drives the driven element in a direction opposite to the direction it is moved because of the bodily advance of the planet units themselves. Thus for a given number of revolutions of the sun gear shaft the driven shaft is advanced a much smaller amount than would be the case in the two sun gear type, assuming assemblies of approximately the same size. It is to be remembered that where I refer to driving and driven members as being associated with certain parts of my novel planetary gear drive that such terms are relative terms only and that the driving element may become the driven element as far as the principles of the present invention are concerned. That is, where I refer to the rotatable internal gear member as being associated with the driven element and driven thereby at a reduced speed compared to the rate of rotation of the motor or driving shaft, it is obvious that the shaft associated with the rotatable internal gear member may become the driving shaft whereupon the shaft associated with the sun gear or gears will be driven at a much higher speed.

In Figure 14, the driven shaft is represented by the reference numeral 260 and the inner end of this shaft is fixedly secured to an internal gear member 261 comprising a hub 262 keyed or otherwise secured to the shaft 260, a web 263, a rim portion 264 having an interior curvature 265 which is of a diameter equal to the diameter of the pitch circle of the internal gear ring 266 secured in any desired manner to the rim 264. The internal ring gear 266 meshes with the planet pinions 250 and the roller surface 265 is supported upon and in rolling contact with the roller discs 251 connected with the planet pinions 250. Hence the inner end of the driving shaft 253 is supported upon the pitch circle discs of the planet gears and since the inner end of the driven shaft 260 is supported upon the roller discs 251 it will be apparent that these ends of the shafts may be loosely received within the housing 235 and do not contact therewith. In this case, therefore, all of the moving parts are supported for practically frictionless rolling contact and there are no journal supports for the shafts and gears whatsoever.

The modifications shown in Figures 16 and 17 resemble in some particulars the structure illustrated in Figures 8 and 9 in that there is a gear reduction between the driving sun gear and the planet gears or pinions which mesh with and roll around the internal gear members carried by the housing. In the case of Figures 16 and 17, however, the driven shaft carries an internal gear member whereas in Figures 8 and 9 the driven shaft carries an external gear or a second sun gear.

In Figure 16 the housing 270 carries a pair of rings or plates 271 and 272 which are formed with recesses 273 and 274 and with inwardly extending flanges 275 and 276 which provide cylindrical bearing surfaces which have a diameter equal to the diameter of the pitch circle of the internal ring gears or orbit gears 278 and 279 carried respectively in the recesses 273 and 274. Each of the planet units 281 comprises a relatively large planet gear 282, a pair of small planet gears or pinions 283 and an additional planet pinion or gear 284 all rigidly secured to the planet shaft. The planet shaft also carries adjacent the planet pinions 283 pitch circle discs 286 which roll around the cylindrical bearing surfaces 275 and 276.

The driving shaft 287 has a sun gear 288 at its inner end flanked on either side by pitch circle rollers or discs 289 which cooperate with pitch circle discs 290 mounted on either side of each of the planet gears 282 with which the sun gear 288 is in mesh.

The driven shaft 293 is secured to the internal gear member 294 which carries the internal gear ring 295 and which is provided with a cylindrical surface 296 having a diameter equal to the diameter of the pitch circle of the ring gear 295. The latter gear is in mesh and encircles the planet pinions or gears 284 and roller discs 298 associated with each of the planet gears 284 roll around the cylindrical surface 296 and thereby support the internal gear member 294 and the inner end of the driven shaft 293.

Figures 18 and 19 show a structure which is quite similar to that illustrated in Figures 16 and 17 except that instead of having the roller discs positioned contiguous to the associated gear Figures 18 and 19 illustrate a construction wherein the driving discs and rollers are spaced a considerable distance from the corresponding gear members. In Figures 18 and 19 the housing 300 carries plates or rings 301 and 302 the inner edges 303 and 304 of which serve as bearing discs having cylindrical surfaces of a diameter equal to the pitch circle of the orbit gears 306 and 307 secured to the plates 301 and 302. The planet units 310 include a planet shaft 311, a pair of planet pinions 312 and a relatively large planet gear 313 positioned between the pinions 312, and an additional planet pinion 315 secured near one end of the planet shaft 311. The driving shaft 317 has a sun gear 318 which meshes with the planet gears 313 while the driven shaft 320 carries an internal gear member 321 which has an internal ring gear 323 meshing with the planet pinions 315.

Each planet shaft 311 has rollers 325 and 326 arranged on opposite sides of the large planet gear 313 and adjacent the planet pinions 312. These rollers move around the cylindrical surfaces 303 and 304 and support the weight of and the loads imposed upon the planet units. The planet shaft of each of the planet units also carries a pitch circle disc 330 adjacent the planet pinion 315 and the disc has a diameter equal to the pitch circle of the pinion. The internal gear member 321 carries a bearing ring 331 clamped underneath the ring gear 323 and the ring has a cylindrical bearing surface equal in diameter to the diameter of the pitch circle of the ring gear 323.

Pitch circle discs 335 and 336 are secured to the planet shafts 311. These discs are of a diameter equal to the diameter of the pitch circle of the large planet gears 313 but are not positioned adjacent to them, as in the case of Figures 16 and 17, but are spaced therefrom a substantial amount, being mounted outside of the planet pinions 312. The driving shaft 317 carries pitch circle rollers 337 and 338 which are of a diameter equal to the diameter of the pitch circle of the sun gear 318 but which are spaced apart and about equal to the spacing of the pitch circle discs 335 and 336. By virtue of this construction the driving shaft 317 is supported upon the planet units by means having wide bearings thereon. It will be seen that this particular type of construction has the advantage of providing an assembly which is compact and narrow yet one in which the driving shaft has a sturdy support upon widely spaced members, such as the case of Figures 14 and 15. If desired, small flanges 340 and 341 may be provided on the pitch circle rollers 337 and 338 for the purpose of preventing any axial displacement of the driving shaft 317.

The operation of the three modifications illustrated in Figures 14 to 19 inclusive is substantially the same in each case. The rotation of the sun gear causes the planet units to slowly rotate around the ring gears and also to rotate about their own axes. The rotation of the planet units about their own axes is in a direction opposite to the direction of rotation of the sun gear but the advance of the planet units around the ring gears is in the same direction as the rotation of the sun gear. By virtue of its connection with the planet units the rotatable internal gear tends to be rotated in the same direction as the rotation of the sun gear by the advance of the planet units but the rotation of the planet pinions with which the rotatable internal gear member is in mesh tends to cause the internal gear member to rotate in the opposite direction. In this manner a differential is established between the planet gears or pinions and the planet pinion which meshes with the rotatable internal gear. By choosing suitable gear ratios between the large planet gears and the sun gear and between the various planet pinions and associated stationary and rotatable internal gear members almost any desired ratio may be obtained. Furthermore, as pointed out above, the sun and internal gear type differs materially from the two sun gear types wherein the rotation of planet units and the advance of the units in their orbits both tend to cause the second or driven sun gear to rotate in the same direction whereby the effect of these two different motions are cumulatively imposed upon the driven element of the transmission drive.

While in Figures 14 to 19 inclusive I have illustrated three forms of the sun and internal gear type of planetary gear drive as embodied in a construction in which the housing is arranged as a stationary or fixed element of the device, it will be understood, of course, that if desired the housing shown in Figures 14 to 19 may be journaled for rotation in the same manner as the housing is rotatably mounted in Figures 1 to 13 inclusive. Such an arrangement is contemplated by the present invention.

Figures 20 to 23 inclusive illustrate four possible applications of the planetary gear drives described above. In Figure 20 the source of power is represented by the electric motor 350 the driving shaft 351 of which carries a coupling flange 352 which is adapted to be secured to the coupling flange associated with the driving shaft of the planetary gear assembly described above particularly those illustrated in Figures 14 to 19 where the housing is stationary at all times. The coupling flange on the driven shaft of the planetary gear assembly is shown in Figure 20 as connected to a shaft 355 with which the load or object to be driven is associated. The load 356 is only diagrammatically indicated in Figure 20 and in this connection it is to be noted that this load may be either a moving object such as an automotive vehicle or a railway car or it may be a stationary device such as a machine or machines utilized in factory production lines and the like. Figure 20 shows an arrangement wherein a simple gear reduction is desired with either the motor 350 or the load 356 on the high speed end thereof.

Figures 21, 22 and 23 illustrate the application of a planetary gear assembly of the three-way type constructed according to the principles of the present invention and arranged in the manner more fully pointed out in my copending applications referred to above and claimed therein. Briefly, such installations contemplate the provision of a direct current motor, which is easily controlled, connected either by V-belts or gears or equivalent means with the rotatable housing indicated by the reference numeral 360 in Figures 21 to 23 and an alternating current motor 363 connected to the driving shaft 361 of the planetary gear assembly, the load 364 being connected with the driven shaft 365. The principal advantage of this arrangement is that the speed of the load can be easily controlled. It is well known that alternating current motors are primarily constant speed devices in that they are not easily adjusted to secure various speeds. By connecting an alternating current motor with the driving shaft of one of my improved planetary gear drives the speed of the load can be controlled by varying the speed imparted to the rotatable housing by varying the speed of the direct current motor 358. Thus, the speed of the driven machine or load may be increased above that obtainable from the fixed speed of the alternating current motor by causing the direct current motor to drive the housing in the same direction that the alternating current motor is rotating. Conversely, if the housing 360 is allowed to rotate in the other direction the speed of the driven shaft and that of the load may be decreased below the fixed speed of the alternating current machine. Figure 21 illustrates a V-belt drive between the direct current motor and the rotatable housing while Figure 22 illustrates a gear drive between these elements, the housing 360 being equipped with a ring gear 368 which is in mesh with an idler 369 driven by the pinion 370 connected with the shaft of the direct current motor 358.

Figure 23 shows a slightly different arrangement in that the alternating current motor is connected with the driving shaft 361 of the planetary gear assembly while the direct current motor 358 is connected with the driven shaft 365 of the planetary gear assembly, the latter shaft in this arrangement actually acting as a second driving shaft. The housing 360 is connected by belts or the like 373 with the load 364. With this particular arrangement the gear ratios between the load and the driving elements is somewhat different than in the case of the arrangements shown in Figures 21 and 22.

The particular manner of installing and using my novel two-way or three-way planetary gear drive illustrated in Figures 20 to 23 form no part of the present invention per se but are adequately disclosed and claimed in my copending applications referred to above. They are shown here only for the purpose of illustrating one of the many possible applications a planetary gear drive constructed according to the principles of the present invention may have. It suffices to note that the direct current motor 358 may be braked or the housing 360 held stationary by any suitable means, in which case the alternating current motor 363 can be utilized to drive the load alone. Or the alternating current motor 363 of the shaft 361 may be locked in stationary position in which case the direct current motor 358 can be utilized to drive the load 364 alone. Under certain conditions it may be desirable to drive the load in either of these ways but it is also possible to drive the load at a speed greater than the speed it would be driven with either the direct current motor or the alternating current motor operating alone. This is accomplished by causing the direct current motor 318 to drive the housing 360 at the same time as and in the same direction as the alternating current motor 363, as mentioned above. Conversely, the speed of the load 364 may be decreased below the base speed established by the alternating current motor 363 by causing the housing 360 to drive the direct current machine as a generator in the direction opposite to that of the alternating current motor. For further details of these methods of control reference may be had to my Patent No. 1,830,435, dated November 3, 1931, entitled "System of adjustable speed control for alternating current motors", in which this method is disclosed and claimed.

In the descriptions of the various modifications of my self-supporting differential gear drives, the bearing rings and discs and rollers were all described as lying flush with the pitch circles of the associated gears. This is the preferred construction because it provides for pure rolling contact between the gears whereby heavy loads can be taken care of without utilizing excessively large bearings. Where the discs and rollers are cut exactly to the pitch circle there is no sliding friction whatsoever and, in addition, all of the gears are locked in place because the gear teeth of any two gears in mesh extend past the plane of tangency between the contacting rolling surfaces. This preferred arrangement is illustrated in Figure 24 from which it will be seen that the disc $a$ provides a cylindrical rolling surface for the corresponding discs of the mating gear, which surface falls intermediate the addendum circle of the associated gear teeth and the base circle thereof. It will be apparent, therefore, that the teeth of the mating gears will overlap the cylindrical surfaces of the driving disc *a* by an amount which is equal to the difference between the radius of the addendum circle of the mating gear and the radius of its pitch circle.

Under certain conditions, as the assembly of a plurality of stud gears may present difficulties, it may be desirable to have the roller disc of one gear equal in diameter to the diameter of the addendum circle in that gear, as illustrated in Figure 25, in which case the roller disc and the mating gear would have to be of a diameter approximately equal to the diameter of the clearance circle of the mating gear. This would occasion some sliding friction but would have the advantage of easy assembly in that the gears could be assembled by straight axial movement without removing the discs from the gears. This construction may be used at times where the drive is not to be subjected to excessively heavy loads.

Figures 27 and 28 illustrate a variation in the construction of a planetary gear embodying the principles of the present invention. The construction illustrated in somewhat similar to that shown in Figures 18 and 19, but differs therefrom in that the gears are omitted from two of the three planet members, these members being composed merely of rolling discs fastened to the shafts. These discs are identical in size and position to those on the third planet shaft which carries gears as well as discs.

In Figures 27 and 28 the housing 374 carries a pair of rings or plates 375 and 376. The plate 375 is constructed with a cylindrical bearing surface 377 and carries an internal gear 378 set in a recess for ease of alignment. The bearing surface 377 is cut to the pitch diameter of the gear 378. Likewise, the plate 376 bears an internal gear 379 and provides a bearing surface 380 cut to the pitch diameter of the gear 379.

The planet member or assembly 381 is composed of a planet shaft 382 on which is rigidly fixed a gear 383 which meshes with the central or sun pinion 384. Cylindrical discs 385 and 386 which are cut to the pitch diameter of gear 383 provide rolling bearing surfaces which bear on similar discs 387 and 388 which are associated with the pinion 384. The pinion 384 and discs 387 and 388 are rigidly mounted on a drive shaft 389 which is connected with the drive means (not shown).

The planet member 381 also contains pinions 390 and 391 which mesh with the internal gears 378 and 379, respectively. The pinion 390 is provided with an associated disc 392 cut to the pitch diameter of the pinion 390 and which rolls on the bearing surface 377 of the plate 375. The pinion 391 is likewise provided with a disc 393 which rolls on the bearing surface 380 of the plate 376.

Rigidly mounted on planet shaft 382 are pinion 394 and its associated disc 395. The pinion 394 meshes with a third internal gear 396 which is mounted in a frame 397 which is provided with a rolling bearing surface 398 on which the disc 395 rolls. The frame 397 drives a load (not shown) through a drive shaft 399 which is attached to the frame 397.

Planet members 400 and 401 are similar to 381 except that the gears are omitted. It is evident that the number of planet members need not be restricted to three but may be increased, if desirable, providing the proportions of the gears are such that no interference is encountered. As three planet members are the minimum number required for supporting the sun pinion and drive shaft 389, as well as frame 397, this arrangement is to be preferred for its simplicity.

Planet member 400 is composed of a shaft 402 and rolling bearing discs 403, 404, 406, and 407. Discs 404 and 405 are of the same diameter and in the same plane as the discs 385 and 386 and roll on the discs 387 and 388, respectively, on the drive shaft 389. The discs 403 and 406 are of the same diameter and in the same plane as the discs 392 and 393, respectively, and roll on the bearing surfaces 377 and 380. The disc 407 is of the same diameter as the disc 395 and rolls on the bearing surface 398.

Planet member 401 is identical to member 400 and is composed of discs mounted on shaft 409 which are of the same diameters and in the same planes, respectively, as discs 403, 404, 405, 406, and 407.

In order that the weights of members 400 and 401 are each equal to that of member 381, thus obtaining a balanced system, the shaft is enlarged between the discs of planet members 400 and 401, as shown at 408 and 409. By properly proportioning these diameters or by filling in with a heavier metal or one or more additional plates, the weights of members 400 and 401 may be compensated for the omission of the gears.

To maintain the angular displacement of 120° of the planet members around their orbit and thus obtaining a balanced system, side plates or keepers 410 and 411 are provided. The keeper 410 holds the ends of the three planet shafts in proper relative position by means of the bearings at 412, 413, and 414. The keeper 411 holds the opposite ends of the three planet shafts, respectively, in bearings 415, 417, and a bearing on the opposite end of the shaft 409 from 414, which bearing is not shown.

The drive shaft 389 is supported in position by the discs such as 385, 386, 404, 405, and those of planet member 401 which bear on discs 387 and 388 on shaft 389 at three points equidistant around the circumferences of 387 and 388. Likewise, the frame 397 is supported at three equidistant points around the bearing surface 398 by a disc such as 395 and 407 on each planet shaft. The frame 397 is held in position longitudinally by the ends of teeth on gear 396 interlocking with discs 395 and 407 and by flange 416 which interlocks on the other sides of discs 395 and 407.

When assembled, the three planet members are held in position radially by the rolling discs, discs on the planet shafts rolling on those of the sun pinion, the planetary system being held together by the inner surfaces of the discs associated with the internal gears upon which discs fastened to the planet shafts roll.

The planetary gear assembly is locked together in a direction parallel to the planet shafts, that is, each gear and disc is held in its own plane of motion by the interlocking of the gear teeth with the discs.

With respect to the locking together of the planetary gear assembly in the radial and longitudinal directions, this embodiment of the principles of design is similar to that shown in Figures 16 and 17. However, as but one of the three planet members is assembled with gears, it is necessary to provide a means for maintaining correct angular spacing of the planet members around the central pinion and also to keep the three planet shafts parallel to each other and to the central shafts. This is accomplished as described above by means of the side plates or keepers on each end of the gear assembly. Each keeper holds one end of each of the three planet shafts in bearings and maintains them in a fixed relation to each other. These keepers may be comparatively light as the stresses on these members are comparatively low.

The advantages of this embodiment of the invention are: It is cheaper to construct, the number of gears being reduced to half the number shown in Figures 18 and 19; it is simpler, and it is easier to assemble.

While I have shown and described above the preferred structural embodiments of the present invention, it is to be understood that my invention is not to be limited to the specific means shown and described but that, in fact, widely different means may be employed in the practice of the broader aspects of my invention. For example, I have illustrated a planetary gear drive in which the principle of complementary rolling supporting surfaces have been embodied, it will be apparent that other types of gear reductions and the like may also be arranged with complementary rolling surfaces for the purpose of supporting and holding the various gears in proper position.

What I claim, therefore, and desire to secure by Letters Patent is:

1. A self-supporting differential gear drive comprising, in combination, a central shaft, a sun gear thereon, planet gear units meshing with the sun gear, a rotatable orbit gear meshing the planet gear units, said orbit gear, said planet gears and said sun gear having cooperating cylindrical roller surfaces lying substantially on the pitch circles of the gear teeth of said gears, and driving means for the rotatable orbit gear.

2. A self-supporting differential gear drive comprising, in combination, a central shaft, a sun gear thereon, planet gear units meshing with the sun gear, a planet shaft driven by each planet gear, a cage for carrying said planet shafts, connected to a load shaft coaxial with said central shaft, a rotatable orbit gear meshing the planet gear units, said orbit gear, said planet gears and said sun gear having cooperating cylindrical roller surfaces lying substantially on the pitch circles of the gear teeth of said gears, and driving means associated with said rotatable orbit gear.

3. A journal-less planetary gear drive comprising, in combination, a sun gear, planet gears driven thereby, a shaft carried by each planet gear, a planet pinion on each end of said shafts, a pair of relatively fixed internal gears meshing with said pinions, and means comprising cooperating discs having rolling contact and coaxially positioned with respect to each of said gears and pinions to hold them in their proper relative positions.

4. In a gear train, a sun gear, a plurality of at least two planet gears in mesh with the sun gear, a shaft carried by each planet gear, a pinion on each end of said shaft, a pair of relatively fixed internal ring gears receiving said pinions and shafts in spaced relationship, whereby when said sun gear rotates the planet gears revolve about the sun gear in their orbits, and rolling contact means on each of said pinions and gears to support the entire assembly and to hold said pinions and gears in their proper relative positions.

5. A planetary gear transmission comprising, in combination, a pair of spaced apart relatively fixed internal gears, a system of planet gear units associated with said spaced apart gears, each unit comprising a planet shaft carrying at least a pair of pinions and a planet gear, said pinions meshing respectively with said internal gears, a sun gear meshing with all of the planet gears of said units, and sets of cylindrical discs associated with each of said pinions and gears, constituting rolling bearing supports for each member of the gear assembly.

6. A mechanical movement comprising, in combination, a driving shaft having a driving gear, a plurality of planet gears each carrying a shaft and rotated by and revolvable about said driving gear, discs on each of said shafts of the same diameter as the diameter of the pitch circle of said planet gears, means acting as a disc on said driving shaft of the same diameter as the diameter of the pitch circle of the driving gear and adapted to have rolling contact with said discs, planet pinions on said planet gear shafts, a pair of internal gear members meshing with two of the planet pinions on each planet shaft, a third internal gear member meshing with another of the planet pinions on each planet shaft, and contacting discs associated with said internal gear members and cooperating planet pinions.

7. A self supporting gear drive comprising, in combination, a casing, means mounting the casing for rotation, a shaft having a sun gear arranged substantially coaxially of said casing, a second shaft having a gear thereon and coaxially mounted with respect to the first shaft, a planet gear unit comprising two planet gears one meshing with said sun gear and the other meshing with said other gear, means mounting the planet gear unit for epicyclic movement about the axes of said shafts, and means cooperating with said gears and providing cooperating cylindrical roller surfaces lying on the pitch circles of the respective gears for taking radial loads.

8. A self-supporting differential gearing comprising a sun gear, a planet shaft having a relatively large planet gear thereon meshing with said sun gear a pair of relatively small planet pinions mounted on said planet shaft, one on either side of said planet gear, a pair of orbit gears meshing respectively with said planet pinions, and means including discs having cylindrical roller surfaces lying substantially on the pitch circles of the gear teeth of said gears and cooperating with said gears to support radial loads imposed thereon.

9. A self-supporting differential gearing comprising a sun gear, a planet shaft having a pair of relatively large planet gears thereon, a relatively small planet pinion mounted on said shaft between said planet gears, one of said planet gears meshing with said sun gear, gear means meshing with said planet pinion, a pair of orbit gears meshing respectively with said planet gears, and means for supporting and spacing said gears comprising members having cooperating cylindrical roller surfaces lying substantially on the pitch circles of the gear teeth of said gears.

10. A self-supporting differential gearing comprising a sun gear, a planet shaft having a pair of relatively large planet gears thereon, a relatively small planet pinion mounted on said shaft adjacent one of said planet gears, one of said planet gears meshing with said sun gear, a pair of orbit gears meshing respectively with said planet gears, a gear meshing with said planet pinion, and means for supporting and spacing all of said gears comprising cooperating cylindrical roller surfaces lying substantially on the pitch circles of the gear teeth of said gears.

11. A self-supporting gear drive comprising a casing, a pair of spaced apart internal ring gears carried by the casing, planet gear units, each comprising a planet shaft, a pair of spaced apart planet gears carried thereby and meshing with said ring gears and a planet pinion, a sun gear shaft having a pair of sun gears thereon meshing respectively with said planet gears, a third internal gear coaxial to other said internal gears meshing with said planet pinions, and means associated with each of said gears and providing cooperating cylindrical rolling surfaces to carry the radial loads to which the gears are subjected and to support and align each unit of the assembly.

12. A self-supporting gear drive comprising a casing, a pair of spaced apart internal ring gears carried by the casing, a planet gear unit comprising a planet shaft and gear means meshing with said internal gears, a sun gear unit meshing with certain of said planet gear means, an additional pinion on the planet shaft positioned outside the plane of either of said internal gears, gear means associated with said pinion and adapted to be driven thereby, and means providing cylindrical roller surfaces associated with said gears and pinion and of the same diameter as the pitch circle of the corresponding gear teeth to carry the radial loads imposed thereon.

13. A self-supporting differential gear drive comprising, in combination, a rotatable casing, journal supports for the casing, a shaft having a sun gear thereon, and coaxially mounted with respect to the axis of rotation of the casing, planet gear units meshing with the sun gear, an orbit gear carried with the casing and meshing the planet gear units, said orbit gear, said planet gears and said sun gear having cooperating cylindrical roller surfaces lying substantially on the pitch circles of the gear teeth of said gears, a second shaft also coaxially mounted with respect to the axis of rotation of the casing, and means actuated by the revolution of the planet gear units for driving said second shaft.

14. A self-supporting differential gear drive comprising, in combination, a rotatable casing, a shaft having a sun gear thereon, planet gear units meshing with the sun gear, an orbit gear on the casing meshing the planet gear units, said orbit gear, said planet gears and said sun gear having cooperating cylindrical roller surfaces lying substantially on the pitch circles of the gear teeth of said gears, a second shaft coaxially arranged with respect to the first shaft, said casing being journaled for rotation about an axis substantially coinciding with the axes of said shafts, and means actuated by the revolution of the planet gear units for driving said second shaft and vice versa.

15. A compound epicycloidal gear system consisting of sun gears, orbit gears, and planet members, said members each consisting of a shaft on which are mounted gears meshing with said sun gears and other gears meshing with said orbit gears, and means associated with each gear to provide therefor a cylindrical rolling surface equal in diameter to its pitch circle by means of which the entire assembly is supported and aligned.

16. A self-supporting compound epicycloidal gear reduction composed of sun gears, orbit gears, and planet members, means associated with each gear to provide therefor an associated cylindrical rolling surface equal in diameter to its pitch circle, one planet member consisting of gears and associated rolling surfaces, other planet members consisting of corresponding rolling surfaces but without gears, said other planet members serving to brace and support the gear assembly, and end plates carrying the ends of the planet members in fixed relation to each other.

17. A self-supporting planetary gear drive comprising a casing, a pair of spaced apart internal ring gears fixed to the casing, a planet member comprising a planet shaft and gear means meshing with said internal gears, a sun gear unit meshing with gear means on said planet shaft, cylindrical roller surfaces associated with said internal gears, planet gear means and sun gear, other planet members comprising roller surfaces without gears for cooperating with said roller surfaces for supporting and spacing said gears and for relieving the gears from radial loads, and side plates for maintaining the said planet members in fixed angular relation to each other in their orbit.

18. A self-supporting gear drive comprising a pair of spaced apart relatively fixed internal ring gears with associated cylindrical bearing surfaces equal in diameter to the pitch circles of said gears, a sun gear member co-axially situated within said gears, consisting of a drive shaft, a pinion, and cylindrical bearing surfaces equal in diameter to the pitch circle of the pinion, planet members between said sun member and said internal gears, each planet member having cylindrical bearing surfaces rolling on the said bearing surfaces of the internal gears and other cylindrical bearing surfaces rolling on and supporting the said bearing surfaces of the sun member, means for maintaining the planet members in alignment comprising end plates having bearings for the ends of the planet shafts, a third rotatable internal gear supported by an associated cylindrical bearing surface rolling upon and supported by additional bearing surfaces on the said planet members, a driven shaft connected to said rotatable internal gear member, and gears on one of the planet members for transmitting energy from the drive shaft to the driven shaft through the rotatable internal gear member, the said relatively fixed internal gears acting as a fulcrum.

19. A differential gear drive comprising in combination, a casing mounted for rotation, a pair of spaced apart internal ring gears carried thereby, driving means for said casing, planet gear units, each unit consisting of a shaft, a pair of planet gears meshing with said internal gears and a planet pinion, a sun gear unit arranged substantially coaxially of the casing and meshing with said planet gear unit, and a gear meshing with all of said planet pinions and substantially coaxial to said casing, said gears and pinions having supporting and aligning means comprising co-operating cylindrical roller surfaces lying on the pitch circles of the gear teeth of said gears.

20. A journal-less gear drive comprising, in combination, a casing, a pair of spaced apart internal ring gears carried by the casing, at least three planet gear units, each comprising a planet shaft, a pair of spaced apart planet gears secured to said shaft and meshing respectively with the ring gears, and a planet pinion, a gear having a load shaft and meshing with all of said planet pinions, a sun gear unit arranged coaxially of the casing and comprising gear means meshing with at least one of said spaced apart planet gears of each unit, and means providing cooperating cylindrical roller surfaces associated with each of said gears and arranged to relieve said gears of radial loads and to provide rolling bearing support for said planet units, sun unit, and said load driving gear.

ALLEN M. ROSSMAN.